United States Patent [19]
D'Agostino et al.

[11] Patent Number: 4,543,169
[45] Date of Patent: Sep. 24, 1985

[54] GOLD RECOVERY PROCESS

[75] Inventors: Vincent F. D'Agostino, Huntington; Joseph Y. Lee, Lake Grove; Stephen Zapisek, Huntington Station; George Schore, Great Neck, all of N.Y.

[73] Assignee: RAI Research Corporation, Hauppauge, N.Y.

[21] Appl. No.: 527,967

[22] Filed: Aug. 31, 1983

[51] Int. Cl.[4] .................. C25C 1/00; C25C 1/20; C25C 1/12; C25C 1/16

[52] U.S. Cl. .................. 204/105 R; 204/106; 204/109; 204/110; 204/116; 204/159.17; 210/670; 210/684; 423/14; 423/22; 423/24; 423/100; 423/112; 423/DIG. 14

[58] Field of Search ............ 204/106, 116, 109, 110, 204/159.17, 105 R; 210/670, 684; 423/24, 100, DIG. 14, 22, 112

[56] References Cited

U.S. PATENT DOCUMENTS

| 4,230,549 | 10/1980 | D'Agostino et al. | 204/159.17 |
|---|---|---|---|
| 4,267,159 | 5/1981 | Crits | 210/684 |
| 4,321,145 | 3/1982 | Carlson | 210/685 |
| 4,339,473 | 7/1982 | D'Agostino et al. | 427/44 |
| 4,372,830 | 2/1983 | Law | 210/684 |
| 4,500,396 | 2/1985 | D'Agostino et al. | 210/684 |

*Primary Examiner*—R. L. Andrews
*Attorney, Agent, or Firm*—Kenyon & Kenyon

[57] ABSTRACT

A method is described for precious metal recovery from acidic precious metal-cyanide solutions by means of a weakly-basic anion-exchange material comprising a polymeric felt incorporating radiation-grafted pyridinyl functional groups.

16 Claims, No Drawings

GOLD RECOVERY PROCESS

Gold electroplating processes have become extremely important in the electronics and computer industries because of the low contact resistance, corrosion resistance and solderability of the metal. Although it is possible for platers to formulate plating baths from published sources, most rely on proprietary formulations which usually contain small to significant amounts of alloying elements such as antimony, tin, nickel, copper, silver, indium, cadmiun and cobalt. Gold is traditionally plated from cyanide baths, as are several other metals including silver, cadmium, copper and indium.

The cyanide baths can be divided into three types: alkaline, neutral and acid, of which the acid baths are the most versatile. These baths may initially contain up to 2-16 g of gold per liter, usually available as potassium gold dicyanide [$KAu(CN)_2$]. As the plating reaction proceeds, the concentration of impurities in the gold solution increases until the solution is no longer useful. Electrolytic recovery methods are employed to recover the gold from such spent solutions. However, electrolytic recovery is not practical for dilute solutions of low conductivity. In processing, the gold plating bath is removed and the plating cell treated with a "drag-out" rinse and finally by a cold water rinse. The drag-out gold concentration ordinarily approaches 300 ppm. In some operations, this gold concentration may be as high as 1000 ppm (1 gram/liter). Anionic gold compounds have also been recovered from dilute solutions by the use of strong base anion-exchange resins incorporating quaternized aliphatic amino groups. However, anionic gold is so strongly bound by such resins that it can only be recovered by burning away the polymeric resin substrate.

Therefore, it is an object of the present invention to provide a polymeric, ion-exchange material in the form of a filter cartridge which will efficiently complex and remove low concentrations of metals from aqueous solutions and which can easily be regenerated to an active, metal-free form.

It is a further object of the present invention to provide a method for recovering gold from acidic cyanide plating baths.

It is a further object of the present invention to provide a method for producing pure gold metal from plating effluents without contamination by metallic sludge by-products.

It is a further object of the present invention to provide ion-exchange materials in the form of filter cartridges which do not exhibit the usual attrition associated with ion exchange resins when they are exposed to hot metal-containing solutions of high alkalinity or acidity.

BRIEF DESCRIPTION OF THE INVENTION

The objects of the present invention are achieved by contacting acidic, aqueous solutions comprising anionic metal cyanide complexes with weakly-basic anion-exchange materials formed by radiation grafting polymeric felts with pyridinyl functional groups. The complex which results when the pyridine nitrogen atom interacts with the negatively-charged metal cyanide anion is easily broken by washing the complexed ion exchange material with an aqueous base. The metal may then be recovered from the basic solution by known electroplating methods and the ion-exchange material may be washed with water and reused.

DETAILED DESCRIPTION OF THE INVENTION

The ion-exchange materials of the present invention are prepared by radiation-grafting pyridinyl moieties to a substrate comprising a fibrous polymeric felt. Techniques useful for radiation grafting hydrophilic monomers, including the preferred vinyl pyridines, to inert polymeric base films to form separator membranes for electrochemical cells are disclosed in U.S. Pat. No. 4,230,549, the disclosure of which is incorporated by reference herein.

Preferred polymeric felts for use as the ion exchange material substrate include the 2.7 mil nonwoven fibrous polypropylene felt commercially-available as No. 1488 from Kendall Mills, Walpole, Mass. Other porous woven or nonwoven polymeric felts or sheets would be suitable for use as substrates which have a porosity after grafting which would permit an effective flow rate therethrough of the feed and elution solutions, as discussed hereinbelow. Suitable polymeric felt fibers would therefore also include those of nylon, cellulosics, polyethylene, polytetrafluoroethylene and mixtures thereof.

The grafted cartridge substrates are produced by rolling up the nonwoven sheet with an absorbent paper inner layer and immersing the roll in a solution of the pyridine monomer in a suitable solvent. Suitable organic solvents for the grafting monomers are the chlorinated hydrocarbons such as methylene chloride, carbon tetrachloride, 1,1,1- or 1,1,2-trichloroethane; aromatic solvents such as toluene or xylene, or mixtures thereof.

The monomers useful to impart ion-exchange activity to the polymeric substrates when grafted thereto will include a pyridinyl functional group. Preferably the pyridinyl group will be linked to one or more vinylic or ethylenic groups which couple into the polymeric matrix via free radical reactions when the groups are excited by incident radiation. The most preferred pyridinyl monomers are 2- and 4-vinyl pyridine. The amount of monomer employed in the grafting procedure is in the range of from about 10 to about 60% by weight based on the total grafting solution. Other methyl-substituted vinyl-pyridine monomers could also be used.

After immersion in the solution of the monomer, the polymeric felt is irradiated by a source of ionizing radiation such as that provided by a Co-60 source, until the felt is grafted to the extent of about 10-1500%, preferably to about 100-1000%.

The grafted felt substrate is then removed from the monomer bath, washed free of any homopolymer with water and dilute mineral acid, i.e., sulfuric or hydrochloric acid. The pyridinyl groups are then activated toward ion-exchange by washing the grafted substrate with dilute aqueous-base so as to form the corresponding free pyridinyl groups.

The ion-exchange substrate thus prepared may be identified as a weakly-basic anion-exchange material which functions to remove metal cyanide anions, i.e., gold dicyanide anions from acidic aqueous solutions (pH of about 0.5-6) by complexation. The acid salt form of the ion exchange substrate which may gradually be produced in the acidic bath will also function to capture gold dicyanide anions. Once complexed, the $Au(CN)_2$ anions may be eluted from the catridge material by treatment with excess aqueous base (optimal pH of about 11-13).

Therefore, by means of exposure to the ion-exchange materials of the present invention, gold salts may be removed from acidic solutions containing contaminants such as chelators, buffers, other metal ions and the like, and eluted into a basic solution substantially free of said contaminants. Subsequently, metallic gold may be recovered in a state of high purity in a relatively brief period of time by electrodeposition of the gold onto a suitable metallic cathode by techniques well known in the plating art. The basic form of the ion-exchange material is then washed with water and further gold-containing solutions processed.

Typically, the grafted felt is formed into a filter cartridge by winding grafted felt strips onto a cylindrical core of an inert material which is then inserted into a pressure filter housing and capped with an inlet port at one end and at an outflow port at the other. It has been found that ion-exchange cartridges prepared according to the present invention can capture greater than 99% of the gold in a solution containing as little as about 1 ppm-500 ppm gold in one pass at a pass-through rate of up to 15 l/min. and at a capture solution temperature of up to 130° F. When prepared in this manner, filter cartridges may be designed which will capture greater than 99.5% of the gold present in a solution which contains 1-500 ppm of gold in one pass at a rate of 4.2 l/min. Two such cartridges packed with about 60 linear feet each of 28 mil vinylpyridine-grafted polypropylene felt of a 20 in. width will exhibit a capacity of up to about 5 troy oz. of gold metal with an end-point bypass concentration in the captures solution of no more than about 5.0 ppm of gold, preferably about 0.1-1.0 ppm.

Although the gold dicyanide anions are rapidly taken out of the acidic capture solution, they also may be rapidly removed from the ion-exchange cartridge by passing an aqueous solution of an alkali metal hydroxide through the filter bed. Preferably, the pH of the (recovery solution) eluate is adjusted to about 10-13 with sodium or potassium hydroxide and passed through the cartridge and circulated through a suitable plating cell at a rate of about 7-15 l/min.

A typical plating cell for recovery from a cartridge assembly with a 30-40 liter capacity would itself hold 30-40 liters of metal hydroxide-containing electrolyte. The plating cell would be equipped with a rotating stainless steel cathode, a platinum-niobium anode and operated at an electrolyte temperature of about 100°-180° F. at a voltage of up to about 30 volts and a current of up to about 30 amps. When operated in this fashion, useful plating cells will recover at least about 99.0% of the captured gold in no more than about 8 hours, during which time the gold concentration of the basic eluate-electrolyte will be lowered to about 0.1-15 ppm, preferably to about 1-5 ppm. The gold recovered by this process is typically greater than 99% pure. At this purity, further purification steps are unwarranted, a fact which enhances the economic potential of the present process.

As discussed hereinabove, it is expected that the present ion-exchange materials and process will be effective for the recovery of other metals which form useful cyanide complexes which may be plated from acidic, cyanide-containing baths, including silver, copper, iridium, palladium, and the like.

Thus, in use, a typical gold recovery apparatus may comprise two ion-exchange cartridges prepared as described above and arranged in a series. Thirty liters of spent plating solution containing acidified (pH of about 4.0-6.0) potassium gold dicyanide is circulated through the columns at a pump rate of about 0.75-10 l per minute. The bypass (ppm gold in the recovery solution eluate) when the column is holding one troy oz. is about 0.25 ppm; at 3 troy oz. the bypass is about 0.5 ppm and at 5 troy oz. (maximum optimal capacity), the bypass is about 1.0 ppm. Recovery of 99.8% of three ounces of the captured gold as gold metal in the plating cell requires about 8 hours using a 0.1-0.2M aqueous potassium hydroxide recovery solution of about pH 11.5-12.5 heated to at least about 100°-110° F. with a final gold eluate concentration of no more than about 5.0 ppm. The recovered gold assays are 99.9 plus percent pure by atomic absorption spectrometry.

If desired a second series of cartridges may be connected to a reservoir of the gold-containing solution, to allow continuous processing of a large amount of solution. Thus, while the gold in the first set of columns is being eluted and plated out, the flow of the gold-containing capture solution can be switched over to the second set of columns. After the gold has been recovered from the first set of columns and the filter regenerated, the flow can be returned to the first set of columns so that the capture of the gold anions and the recovery of gold metal proceeds continuously.

The invention will be described by reference to the following detailed examples.

EXAMPLE I

PREPARATION OF ION-EXCHANGE MATERIAL

Following the general procedures of U.S. Pat. No. 4,230,549, an ion-exchange material was prepared from 2.7 mil nonwoven polypropylene felt (No. 1488, Kendall Mills, Walpole, Mass.) as follows:

The felt was rolled up with an absorbent kraft paper interlayer and the roll immersed in a solution of 40% by volume of 4-vinylpyridine and 60% by volume of methylene chloride. The felt roll was then irradiated to a 700% graft with a total dose of 1.20 Mrad at a dose rate of 9000 rad/hr. using a Co-60 radiation source. The roll was removed from the bath and the grafted felt washed free of homopolymer with water. The grafted felt was washed free of unreacted monomer with 10% aqueous sulfuric acid. The grafted felt resin was 28 mil in thickness.

EXAMPLE II

GOLD RECOVERY

A filter cartridge was prepared by winding 60 feet of 20 inch wide grafted felt prepared as described in Example I around a 0.75 inch by a 2.0 foot long polyvinyl chloride core, which was then inserted into a 6.0 inch by 2.5 foot polyvinyl chloride pressure filter housing to form one column unit. Two such columns placed in a series represented a total solution holding capacity of 37 liters. The system was filled with water and the cartridges conditioned by repeated washes with dilute acid and base and then converted into the basic form with a 5% potassium hydroxide wash. An 11.4 liter volume of 0.0285M potassium gold dicyanide solution containing 93.30 g of gold was cycled from a holding tank through the system at a rate of 4.8 l/min. After one pass through the two column system, the concentration of gold in the eluate was 0.45 ppm, representing a gold capture by the columns of 93.06 g (99.96% capture).

The columns were drained and water was run through the system to fill a 30 l plating cell equipped with an 11.8 sq. in. stainless steel cathode rotating at about 1500 rpm and a niobium coated platinum anode. A solution of 250 ml of 8M potassium hydroxide was added to the cell to adjust the electrolyte pH to 11.5 and the cell contents heated to 122° F. The basic electrolyte is then cycled through the columns at a rate of about 10 l/min. while the plating cell is operated at 11.0 volts, 7.5 amps. After 8.0 hours, 93.135 g of gold of 99.82% purity plated out on the cathode, representing a gold recovery of 99.9%. The concentration of gold in the circulating 0.134M potassium hydroxide electrolyte had dropped to 5.0 ppm.

After plating, the columns are freed of base by washing them with water and are ready for reuse in the capture cycle. Operation of the system through twenty cycles under these conditions showed no appreciable degradation in column performance.

Table I summarizes Examples III–VIII which illustrate gold recovery procedures using one or two of the columns of Example II to recover gold from commercially available plating solutions.

Table I demonstrates the efficacy of the ion-exchange materials of the present invention in recovering gold of a high purity from commercially-available plating bath solutions without the need for any pretreatment of the solutions to remove chelating agents, additional metal components and the like. The column units of Exs. 2–8 also

TABLE I

| | GOLD RECOVERY FROM PLATING BATH SOLUTIONS | | | | | | | |
|---|---|---|---|---|---|---|---|---|
| EX. | GOLD SOLUTION | INPUT RATE | TOTAL WT. OF GOLD IN | TOTAL WT. OF GOLD CAPTURED | PERCENT TOTAL GOLD INPUT CAPTURED | RECOVERY RUN TIME** | RECOVERY PERCENT | PURITY OF GOLD RECOVERED | AVG. END PT. BYPASS (ppm) |
| 3$^a$ | Oro Temp 24* | 7.6 l/min | 32.90 g | 32.78 g | 99.65 | 33 hrs. | 94.0 | >99% | 3.80 |
| 4 | Oro Temp 24 | 7.6 l/min | 31.10 | 30.90 | 99.37 | 33 hrs. | 91.9 | >99 | 6.57 |
| 5 | Orosene 999 | 7.6 l/min | 31.10 | 30.67 | 98.63 | 42 hrs. | 96.5 | >99 | 14.2 |
| 6 | Orosene GBC hi speed cobalt-hardened plating solution | 5.0 l/min | 32.80 | 32.79 | 99.98 | 25 hrs. | 91.5 | 99.9+ | 0.2 |
| 7 | Orosene GBC | 5.0 l/min | 32.18 | 32.17 | 99.98 | 25 hrs. | 98.1 | 99.9+ | 0.25 |
| 8 | Orosene GBC | 5.0 l/min | 31.01 | 31.01 | 99.99 | 17.5 hrs. | 96.5 | 99.9+ | 0.13 |

*Available from Technic Inc., Cranston, R.I.: Gold is present as acidified AuK(CN)$_2$ at a gold concentration of 8.22 g/l. Examples 6–8 also contain cobalt as Co(CN)$_2$ at a conc. of 0.1 g/l.
$^a$Examples 3–5 employed one of the column units and Examples 6–8 employed a series of two column units prepared as described in Exs. I–II.
**All recovery runs at 120–140° F. eluate temperature.

function to effectively recover gold from acidified potassium gold dicyanide solutions which contain as little as 1–500 ppm gold. Thus, the ion-exchange materials of the present invention would be expected to be useful to recover gold from spent plating solutions and drag-out rinses as well as from plating solutions which have been pretreated to remove a major proportion of the gold content by other means.

The invention has been described with reference to various specific and preferred embodiments and techniques. However, it should be understood that many variations and modifications may be made while remaining within the scope and spirit of the invention.

We claim:
1. A method of metal recovery comprising;
 (a) forming a weakly-basic anion-exchange material by radiation-grafting monomers comprising pyridinyl functional groups to a polymeric felt substrate to the extent of 10–1500%; and
 (b) contacting the anion-exchange material with an acidic aqueous solution comprising metal-cyanide anions so as to form a complex between the anions and the pyridinyl groups, thereby removing the anions from solution.

2. The method of claim 1 further comprising:
 (a) decomplexing said metal cyanide anions by contacting the ion-exchange material with an aqueous base; and
 (b) recovering the metal from the aqueous base by electrodeposition.

3. The method of claims 1 or 2 wherein the metal is selected from the group consisting of gold, silver, copper, palladium, cadmium and indium.

4. The method of claim 3 wherein the metal is gold and the precious metal-cyanide anions comprise gold dicyanide anions.

5. The method of claims 1 or 2 wherein the monomer comprises 2-vinyl pyridine or 4-vinyl pyridine and the polymeric felt comprises a nonwoven polypropylene felt.

6. The method of claim 2 wherein the aqueous base comprises sodium hydroxide or potassium hydroxide.

7. A method of gold recovery comprising:
 (a) forming a weakly-basic anion-exchange material by radiation-grafting 2-vinyl pyridine or 4-vinyl pyridine to a polymeric felt substrate to the extent of 100–1000%; and
 (b) contacting the resin with an acidic aqueous solution comprising potassium gold dicyanide so as to form a complex between the pyridine groups and the gold dicyanide anions, thereby removing the anions from solution.

8. The method of claim 7 further comprising:
 (a) decomplexing the anion complex by contacting the ion-exchange material with an aqueous solution of potassium or sodium hydroxide; and
 (b) removing the gold from the aqueous base by electrodeposition.

9. The method of claims 7 or 8 wherein the polymeric felt comprises a nonwoven polypropylene felt.

10. The method of claim 8 wherein the aqueous solution of potassium or sodium hydroxide is heated to about 100°–180° F. prior to being contacted with the ion-exchange material.

11. A method of precious metal recovery comprising:

contacting a weakly basic anionic exchange material with an acidic aqueous solution comprising metal-cyanide anions so as to form a complex between the anions and the material, thereby removing the anions from the solution; said material comprising a polymeric felt substrate radiation-grafted to the extent of 10–1500% with a monomer comprising a pyridinyl functional group.

12. The method of claim 11 further comprising:
(a) decomplexing the complex by contacting the anion-exchange material with an aqueous base; and
(b) recovering the metal from the aqueous base by electrodepositon.

13. The method of claims 11 or 12 wherein the metal is gold and the precious metal-cyanide anions comprise gold dicyanide anions.

14. The method of claims 11 or 12 wherein the monomer comprises 2-vinyl pyridine or 4-vinyl pyridine and the polymeric felt comprises a nonwoven polypropylene felt.

15. The method of claim 12 wherein the aqueous base comprises sodium hydroxide or potassium hydroxide.

16. The method of claims 11 or 12 wherein the felt substrate comprises a polymer selected from the group consisting of polypropylene, nylon, polyethylene, polytetrafluoroethylene and cellulosics.

* * * * *